United States Patent
Horiyama

(10) Patent No.: US 7,155,476 B2
(45) Date of Patent: Dec. 26, 2006

(54) PRINT SYSTEM, PRINTING METHOD, AND STORAGE MEDIUM

(75) Inventor: Jun Horiyama, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/426,878

(22) Filed: Oct. 26, 1999

(65) Prior Publication Data

US 2003/0191790 A1   Oct. 9, 2003

(30) Foreign Application Priority Data

Oct. 28, 1998   (JP)   ............................... 10-321363

(51) Int. Cl.
G06F 15/16   (2006.01)

(52) U.S. Cl. ................. 709/203; 358/1.11; 358/1.15

(58) Field of Classification Search ............... 709/255, 709/203; 395/110, 115, 116, 117, 113, 114; 707/10, 535–42; 351/1.15, 1.11; 358/1.11, 358/1.1
See application file for complete search history.

(56) References Cited

U.S. PATENT DOCUMENTS

| | | | | |
|---|---|---|---|---|
| 5,113,355 A | * | 5/1992 | Nomura | 358/1.11 |
| 5,220,674 A | * | 6/1993 | Morgan et al. | 709/223 |
| 5,533,174 A | * | 7/1996 | Flowers et al. | 358/1.15 |
| 5,727,135 A | * | 3/1998 | Webb et al. | 358/1.14 |
| 5,732,197 A | * | 3/1998 | Nakagiri | 358/1.11 |
| 5,781,714 A | * | 7/1998 | Collins et al. | 345/471 |
| 5,799,206 A | * | 8/1998 | Kitagawa et al. | 710/36 |
| 5,887,990 A | * | 3/1999 | Card et al. | 358/1.11 |
| 5,933,584 A | * | 8/1999 | Maniwa | 358/1.15 |
| 5,995,718 A | * | 11/1999 | Hiraike et al. | 358/1.11 |
| 6,243,704 B1 | * | 6/2001 | Ooishi | 707/1 |
| 6,310,693 B1 | * | 10/2001 | Hiraike | 358/1.11 |
| 6,354,752 B1 | * | 3/2002 | Nakagiri | 400/76 |
| 6,507,407 B1 | * | 1/2003 | Matsumoto | 358/1.11 |
| 2002/0048034 A1 | * | 4/2002 | Matoba | 358/1.13 |

* cited by examiner

*Primary Examiner*—David Wiley
*Assistant Examiner*—Phouc H. Nguyen
(74) *Attorney, Agent, or Firm*—Fitzpatrick, Cella, Harper & Scinto

(57) ABSTRACT

In a system in which a plurality of computers and printers are connected, when a font of a document to be printed does not exist in the printer, the font is downloaded to the printer and a fact that it was downloaded is also notified to the other computers.

13 Claims, 13 Drawing Sheets

FIG. 4A

| PRINTER NAME | FONT NAME |
|---|---|
| LBP-1 | MING TYPE A |
| LBP-1 | GOTHIC A |
| LBP-2 | MING TYPE B |
| LBP-3 | SCHOOL TEXT TYPE A |
|  |  |
|  |  |

FIG. 4B

| PRINTER NAME | FONT NAME |
|---|---|
| LBP-1 | CURSIVE TYPE A |

FIG. 4C

| PRINTER NAME | FONT NAME |
|---|---|
| LBP-1 | MING TYPE A |
| LBP-1 | GOTHIC A |
| LBP-1 | CURSIVE TYPE A |
| LBP-2 | MING TYPE B |
| LBP-3 | SCHOOL TEXT TYPE A |
|  |  |

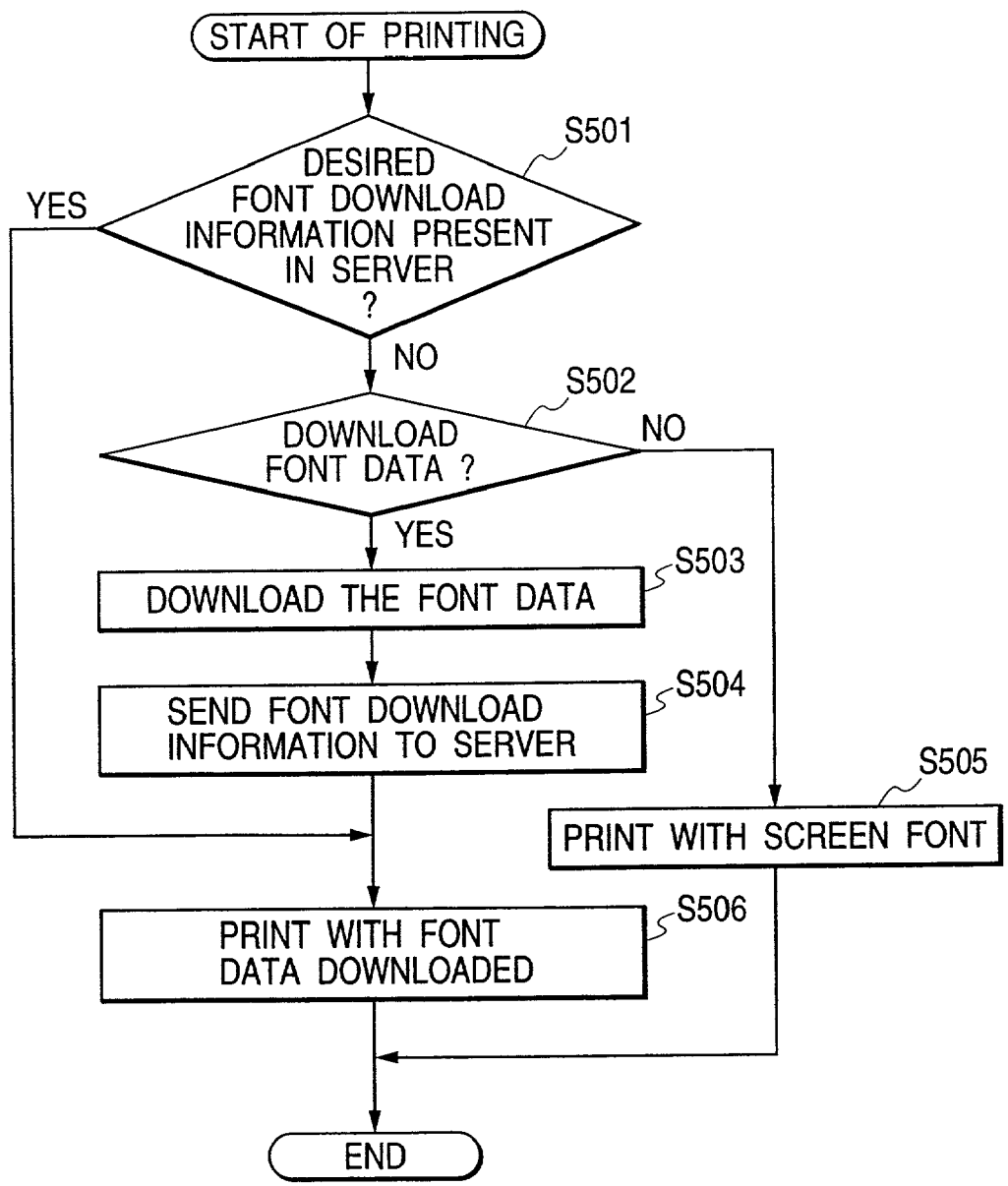

FIG. 13

| DIRECTORY |
|---|
| PROCESSING MODULES FOR FLOWCHARTS OF FIGS.3, 7 AND 10 |
| PROCESSING MODULES FOR FLOWCHARTS OF FIGS.5, 8 AND 11 |
| PROCESSING MODULES FOR FLOWCHARTS OF FIGS.6, 9 AND 12 |
| ⋮ |

PRINT SYSTEM, PRINTING METHOD, AND STORAGE MEDIUM

BACKGROUND OF THE INVENTION

1. Field of the Invention

The invention relates to a print system, a printing method, and a storage medium, in which when font data is registered (downloaded) from a host computer to a printing apparatus such as a printer or the like and the downloaded font data is printed from a host computer connected to a network, a printing process or the like is performed by using the downloaded font data held in the printing apparatus.

2. Related Background Art

In recent years, there has been realized an environment called WYSIWYG (What You See Is What You Get) such that a host computer has therein a function to form font data and font data according to each resolution is formed and sent to a display and a printing apparatus such as a printer, thereby allowing the printing apparatus to print by the same design as characters which are displayed on the display.

In such a printing environment, it is necessary to send the font data to the printing apparatus. However, since it takes time to process if the font data is sent as mentioned above, in recent years, the font data is previously registered (downloaded) into an external memory such as a hard disk (HD) or the like annexed to the printing apparatus and a high speed of the printing process is realized by using the downloaded data.

On the other hand, in the case where a plurality of users use the printing apparatus in common through a network such as LAN or the like, there is provided an environment such that when the printing process is performed by using the font data which was downloaded into an external memory such as a hard disk or the like annexed to the printing apparatus, only a host computer which downloaded the font data can use such data, or an environment such that after information such as font data downloaded in the printing apparatus was confirmed, it can be directly used from each host computer via the network.

In the above conventional print environment, however, there are the following problems and it is demanded to improve it. That is, in an environment such that only the host computer which downloaded the font data can use it or an environment such that after the font data downloaded in the printing apparatus was confirmed, it can be directly used from each host computer via the network, in case of a print system in which a plurality of host computers and printing apparatuses are connected, it is difficult to recognize into which printing apparatus which font data has been downloaded.

SUMMARY OF THE INVENTION

It is, therefore, an object of the invention to provide a print system, a printing method, and a storage medium, in which in the case where information regarding printing apparatuses and information regarding font data are managed by a host computer, a server computer, or the like and outputted from the host computer connected to the same network to the printing apparatus, by enabling the downloaded information to be easily confirmed and enabling the font data downloaded in each printing apparatus to be used in common, a printing efficiency can be remarkably improved.

To accomplish the above object, according to the invention, there is provided a print system in which at least one host computer and one printing apparatus are connected and font data from the host computer is registered into a memory of the printing apparatus, and a printing process is performed by using the registered font data, comprising: transfer means for, when the font data is registered from the host computer into the memory of the printing apparatus, sending the font data and font registration information regarding the printing apparatus to at least one of the other host computer and the memory of the printing apparatus; referring means for referring to the sent font registration information in the case where the host computer prints by using the printing apparatus; discriminating means for discriminating whether a printing apparatus name and a font name which are required by the host computer to print by using the printing apparatus exist in the referred font registration information or not; and printing means for, when it is determined that they exist, performing the printing process by using the font data registered in the memory of the printing apparatus.

BRIEF DESCRIPTION OF THE DRAWINGS

FIGS. 4A, 4B and 4C are diagrams showing contents of font download management information;

FIG. 5 is a flowchart showing a print processing procedure for actually downloading font data in the case where a print command is issued from a host computer to a printing apparatus connected to a network;

FIG. 13 is a diagram showing a memory map in an ROM 3 as a storage medium.

DETAILED DESCRIPTION OF THE PREFERRED EMBODIMENTS

An embodiment of a print system, a printing method, and a storage medium of the invention will now be described. The print system of the embodiment is applied to a print system in which a host computer, a server computer, and a printing apparatus are connected through a network.

[First Embodiment]

Figure 1:
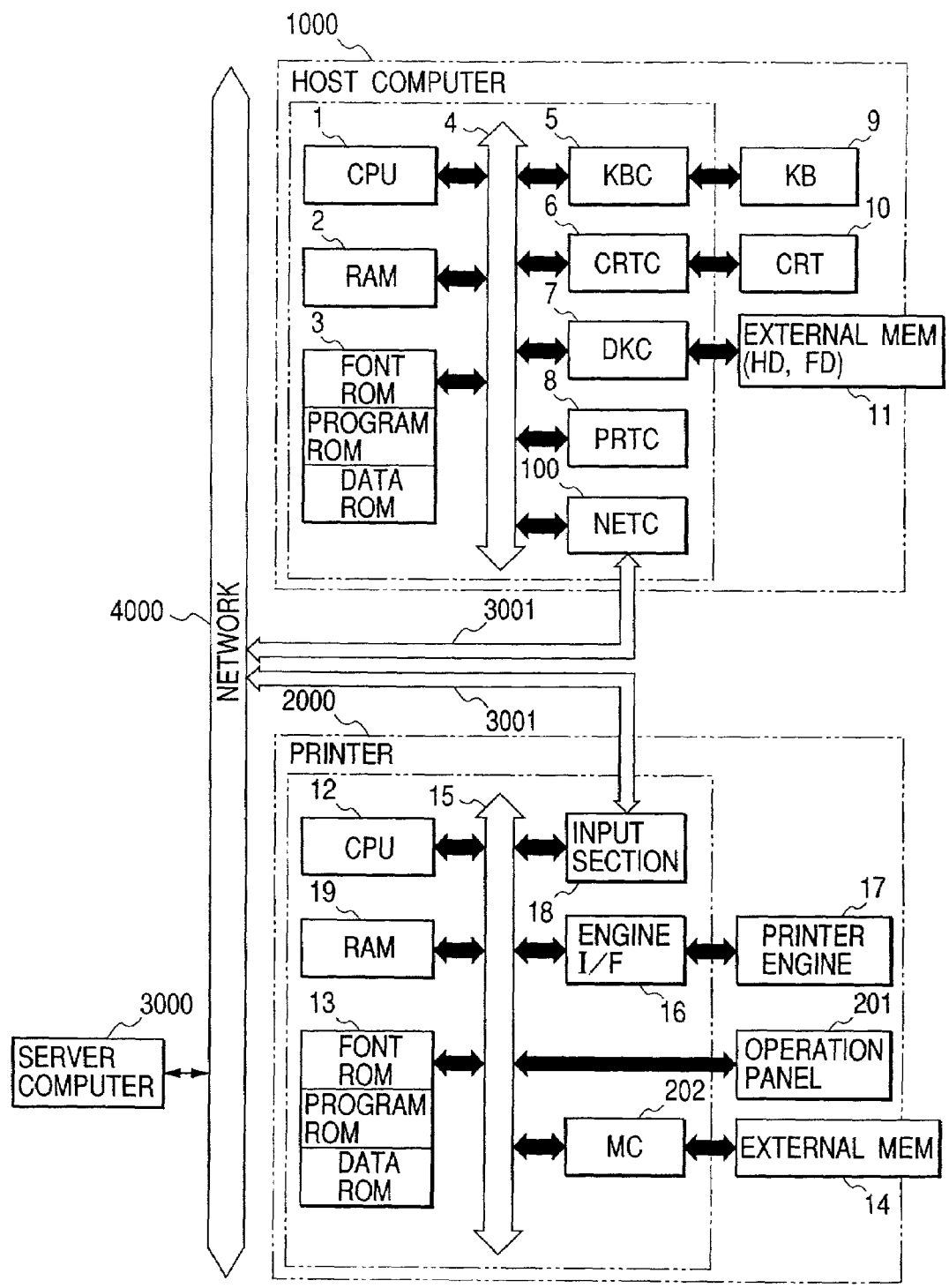
FIG. 1 is a block diagram showing a construction of a print system according to the first embodiment.

FIG. 1 is a block diagram showing a construction of a print system in the first embodiment. In the diagram, reference numeral 1000 denotes a host computer having a CPU 1 for executing a document processing program or the like stored in a program ROM of an ROM 3 or an external memory 11 and processing a document in which a figure, an image, characters, a table (including a spreadsheet or the like), and the like mixedly exist. The CPU 1 integratedly controls each device connected to a system bus 4.

An operating system program (OS) or the like as a control program of the CPU 1 is stored in the program ROM of the ROM 3 or the external memory 11. Font data or the like which is used in a document process is stored in a font ROM of the ROM 3 or the external memory 11. Various data which is used when the document process or the like is performed is stored in a data ROM of the ROM 3.

Reference numeral 2 denotes an RAM which functions as a main memory, a work area, or the like of the CPU 1; 5 a keyboard controller (KBC) for controlling a key input from a keyboard (KB) 9 or a pointing device (not shown); and 6 a CRT controller (CRTC) for controlling a display of a CRT display (CRT) 10.

Reference numeral 7 denotes a disk controller (DKC) for controlling an access to the external memory 11 such as hard disk (HD), floppy disk (FD), or the like for storing a boot program, various applications, font data, a user file, an edition file, a character image data forming program (font rasterizer), a printer control command forming program (printer driver), and the like.

Reference numeral 8 denotes a printer controller (PRTC) which is connected to a printer (not shown) through a bidirectional interface (interface) and executes a communication control process of a communication with the connected printer. In the embodiment, the PRTC 8 executes a communication control process of a communication with a printer 2000 or another computer connected to a network 4000 such as LAN or the like through a bidirectional interface 3001 from a network controller (NETC) 100.

The CPU 1 executes a developing (rasterizing) process of an outline font into, for example, a display information RAM set on the RAM 2, thereby enabling WYSIWYG on the CRT 10. The CPU 1 opens various registered windows on the basis of a command instructed by a mouse cursor (not shown) or the like on the CRT 10 and executes various data processes.

A server computer 3000 is constructed in a manner similar to the host computer 1000 and manages the host computer 1000 and printer 2000 connected to the network 4000. Although only one host computer and one printer are shown in FIG. 1, a plurality of host computers 1000 and printers 2000 can be connected to the network 4000.

In the printer 2000, reference numeral 12 denotes a printer CPU for generating an image signal as output information to a printing section (printer engine) 17 connected to a system bus 15 on the basis of a control program stored in the program ROM of the ROM 13, a control program stored in a external memory 14, or the like.

The control program or the like of the CPU 12 is stored in a program ROM of the ROM 13. Font data which is used when output information is formed is stored in a font ROM of the ROM 13. Particularly, in case of a printer without the external memory 14 such as a hard disk, information or the like which is used on the host computer is stored in a data ROM of the ROM 13.

The CPU 12 can communicate with the host computer 1000 through an input section 18 and the bidirectional interface 3001 and notify the host computer 1000 of information or the like in the printer. In the embodiment, the CPU 12 can communicate with the host computer 1000, another computer, another printer, or the like connected to the network 4000 such as LAN or the like from the input section 18 through the bidirectional interface 3001.

Reference numeral 19 denotes an RAM which functions as a main memory, a work area, or the like of the CPU 12 and is constructed so that a memory capacity can be expanded by an option RAM which is connected to an expanding port (not shown). The RAM 19 is used as an output information developing area, an environment data storing area, an NVRAM, or the like. An access to the external memory 14 such as hard disk (HD), IC card, or the like mentioned above is controlled by a memory controller (MC) 202. The external memory 14 is connected as an option and stores font data, an emulation program, form data, and the like. Operation switches, an LED display, and the like are arranged on an operation panel 201.

The number of external memories mentioned above is not limited to 1 but the system has at least one or more external memories. The printer 2000 is constructed such that a plurality of option font cards as well as built-in fonts and a plurality of external memories in each of which a program to interpret printer control languages of different language systems has been stored can be connected.

Any of a floppy disk (FD), an optical disk, a magnetooptic disk, a magnetic tape, a flash memory, a non-volatile memory such as an NVRAM, a static RAM which is backed up by a battery, and the like is used as a storage medium of the external memory. Printer mode set information can be stored from the operation panel 201 to the storage medium such as an NVRAM or the like mentioned above.

Figure 2:
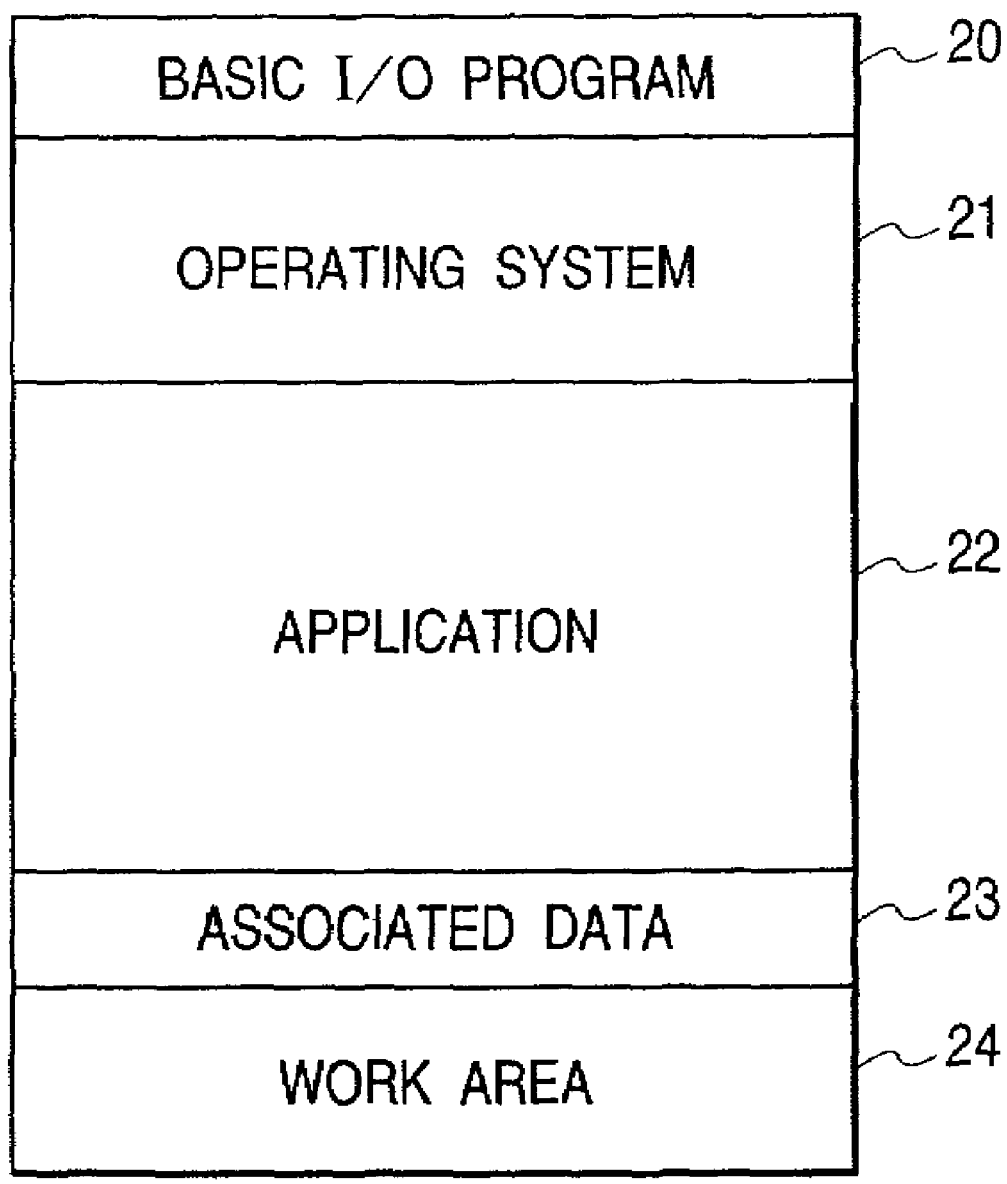
FIG. 2 is a diagram showing a memory map in an RAM 2.

FIG. 2 is a diagram showing a memory map in the RAM 2. In the diagram, reference numeral 20 denotes a basic I/O program; 21 a state where the operating system such as a Windows system has been loaded into the RAM 2 and can be executed; 22 a state where application programs of the embodiment have been loaded into the RAM 2 and can be executed; 23 a state where the associated data has been loaded in the RAM 2; and 24 a work area which is used by each program.

Figure 3:
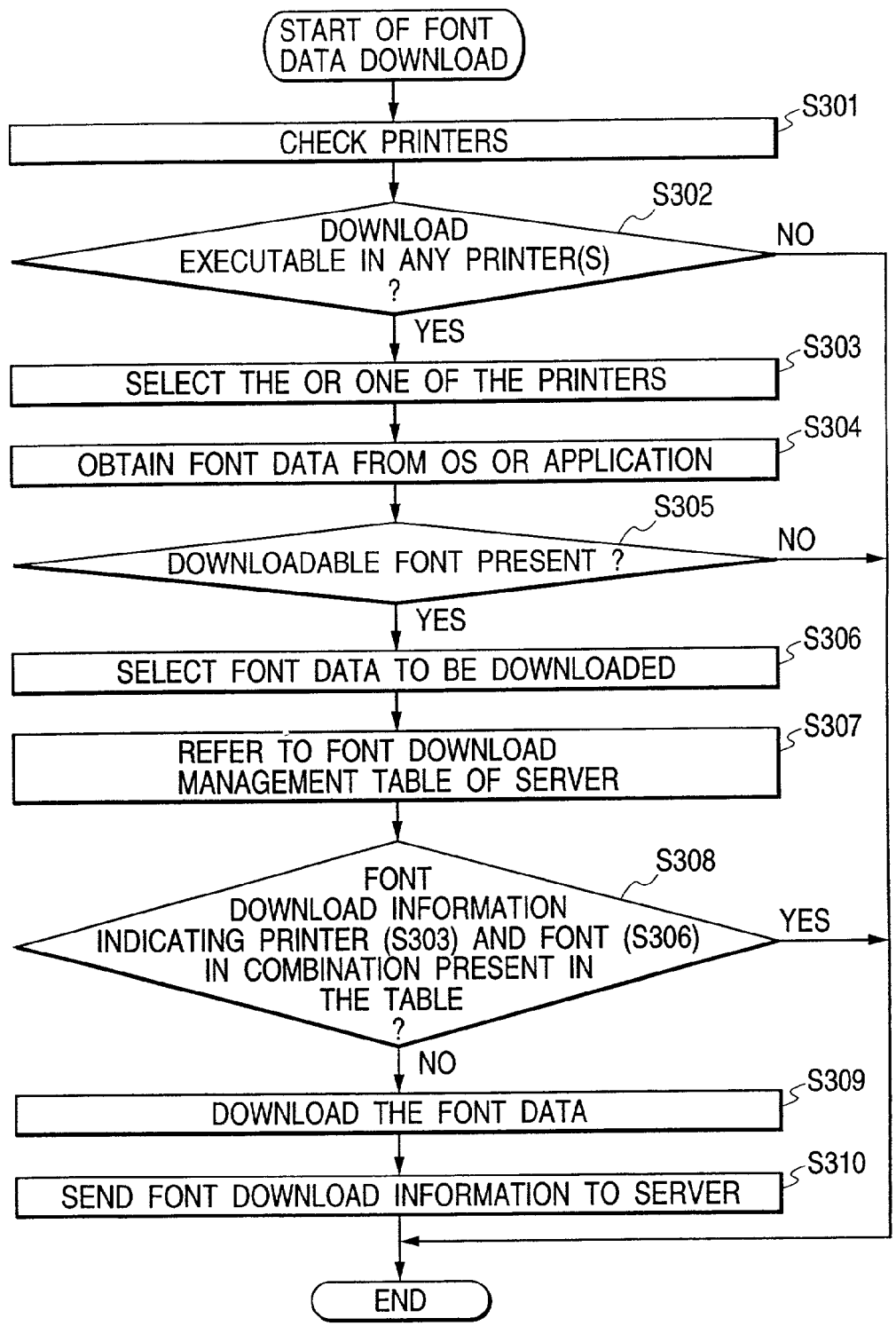
FIG. 3 is a flowchart showing a font download processing procedure.

The print processing operation of the print system having the above construction will now be described. FIG. 3 is a flowchart showing a font data download processing procedure. This processing program has been stored in the program ROM of the ROM 3. After this processing program was loaded into the RAM 2, it is executed by the CPU 1.

First, information of the printing apparatus such as printer, image setter, or the like to be downloaded is obtained from the operating system (OS) or application on the host computer which controls a download program (step S301).

Whether there is a printer into which the font data can be downloaded or not is discriminated (step S302) on the basis of the information of the printer obtained in step S301. If the printer in which the font data can be downloaded does not exist, the processing routine is finished. If it exists, the printer to which the font data is downloaded is selected (step S303).

Information of the font data is obtained from the operating system (OS) or application on the host computer (step S304). On the basis of the information of the font data obtained in step S304, whether there is font data which can be downloaded or not is discriminated (step S305).

If the downloadable font data does not exist, the processing routine is finished. If it exists, the font data to be downloaded is selected (step S306).

Font download information held in a font download management table of the server computer 3000 to manage the host computer 1000, printer 2000, and the like connected to the network 4000 such as LAN or the like is referred to by the host computer 1000 via the network (step S307).

FIGS. 4A to 4C are diagrams showing contents of the font download information. FIG. 4A shows the contents of the font download information stored in the font download management table of the server computer 3000 with respect to the font data which has already been downloaded. This information comprises a "printer name" and a "font name". For example, it is shown that font data of font names of "Ming type A" and "Gothic A" has been downloaded in the printer shown by a printer name "LBP-1".

On the basis of the information referred to as mentioned above, a check is made to see if the font download information comprising a combination of two data of the "printer name" selected in step S303 and the "font data" selected in step S306 exists in the font download management table (step S308).

If it already exists, the processing routine is finished. If it does not exist, the font data is downloaded from the host computer 1000 into the external memory 14 such as an HD or the like of the printer 2000 (step S309). Further, the font download information is formed and sent to the server computer 3000 (step S310) and the processing routine is finished.

FIGS. 4B and 4C show contents of the font download information at this time. First, FIG. 4B shows that the "printer name" selected in step S303 is "LBP-1" and the "font name" selected in step S306 is "Cursive type A". Since the font download information showing such a combination does not exist in the font download management table (FIG. 4A), a downloading process in step S309 is performed. The font download information shown in FIG. 4B is formed and sent in step S310. The information is added into the font download management table as shown in FIG. 4C.

FIG. 5 is a flowchart showing a print processing procedure for actually downloading font data in the case where a print command is issued from the host computer to a certain printer connected to the network. This processing program has been stored in the program ROM of the ROM 3. After this processing program was loaded into the RAM 2, it is executed by the CPU 1. First, a check is made to see if the font download information showing a combination of the name of the printer and the name of font of the data to be printed exists in the font download management table in the server computer 3000 (step S501). If YES, the printing process is performed by using the font data which has already been downloaded in step S306 in FIG. 3 (step S506).

For example, if the print of the font data of the font name "Ming type B" is requested for the printer of the printer name "LBP-2" when the font download management table indicates the font download information in FIG. 4A, since the combination information already exists in the management table, namely, since this means that the font name "Ming type B" has already been downloaded in the printer shown by the printer name "LBP-2", the printing process is performed by using the downloaded font data in step S506.

When the combination information does not exist, whether such information is newly downloaded or not is discriminated (step S502).

For example, if the print by the font data shown by the font name "Cursive type A" is requested to the printer shown by the printer name "LBP-1" as shown in FIG. 4B, since the information does not exist in the font download management table, whether the downloading process is performed or not is discriminated (step S502).

If it is determined that the downloading process is performed, the downloading process is executed (step S503).

Thus, the font download information indicating that the font data shown by the font name "Cursive type A" was downloaded to the printer shown by the printer name "LBP-1" is added to the font download management table held in the server computer 3000 as shown in FIG. 4C (step S504). The printing process is performed by using the downloaded font data (step S506).

If it is decided in step S502 that the downloading process is not performed, the printing process is performed (step S505) by using the screen font existing in the host computer 1000 or by substituting another font data held by the printer 2000 for such a screen font and using such font data. The processing routine is finished.

Figure 6:
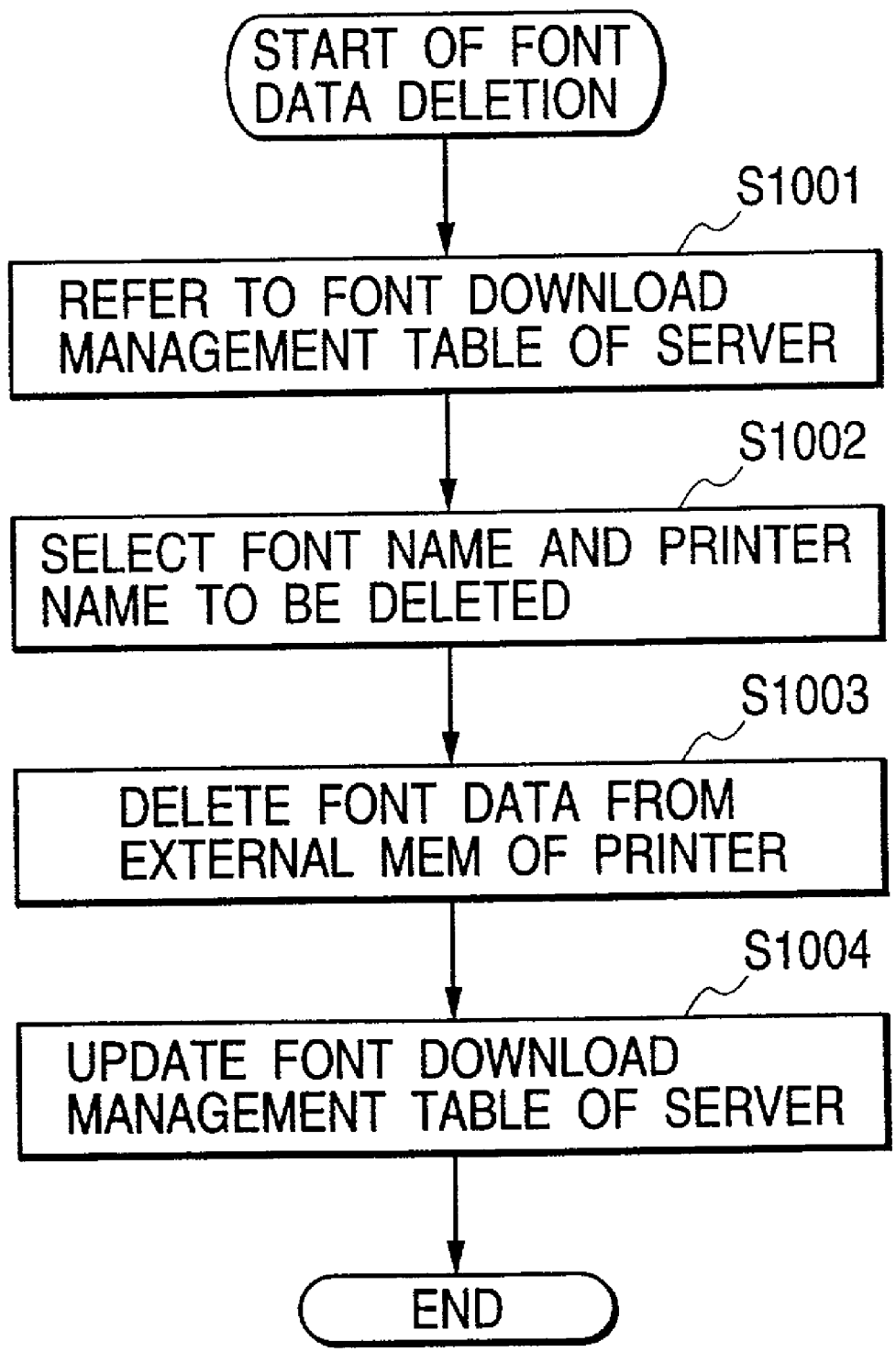
FIG. 6 is a flowchart showing a deletion processing procedure of downloaded font data.

FIG. 6 is a flowchart showing a deletion processing procedure of the downloaded font data. This processing program has been stored in the program ROM of the ROM 3. After this processing program was loaded into the RAM 2, it is executed by the CPU 1. First, the font download management table held in the server computer 3000 is referred to (step S1001). The font name and printer name to be deleted are selected (step S1002). On the basis of the selected contents, the font data held in the external memory 14 of the printer 2000 is deleted (step S1003). An entry selected in step S1002 is deleted from the font download management table held in the server computer 3000 and updated (step S1004). After that, the processing routine is finished.

As mentioned above, according to the first embodiment, when data is outputted to the printer 2000 from the host computer 1000 connected to the network 4000, the font download information can be easily confirmed, the font data downloaded in each printer 2000 can be used in common and a printing efficiency can be remarkably improved. The font download management table can be unitarily managed by the server computer 3000.

[Second Embodiment]

In the second embodiment, since the system construction shown in FIG. 1 and the memory map shown in FIG. 2 are substantially the same as those in the first embodiment, their description is omitted.

In the first embodiment, there has been mentioned the method whereby the font download information for one or a plurality of printers on the network can be unitarily managed by reflecting the information about the printer and fonts which was downloaded by the host computer to the font download management table existing on the server computer. In the second embodiment, however, there is shown a case where just after the font download management table on the server computer was updated, the font download management table is sent to all of the host computers connected to the server computer through the network such as LAN or the like or directly.

Figure 7:
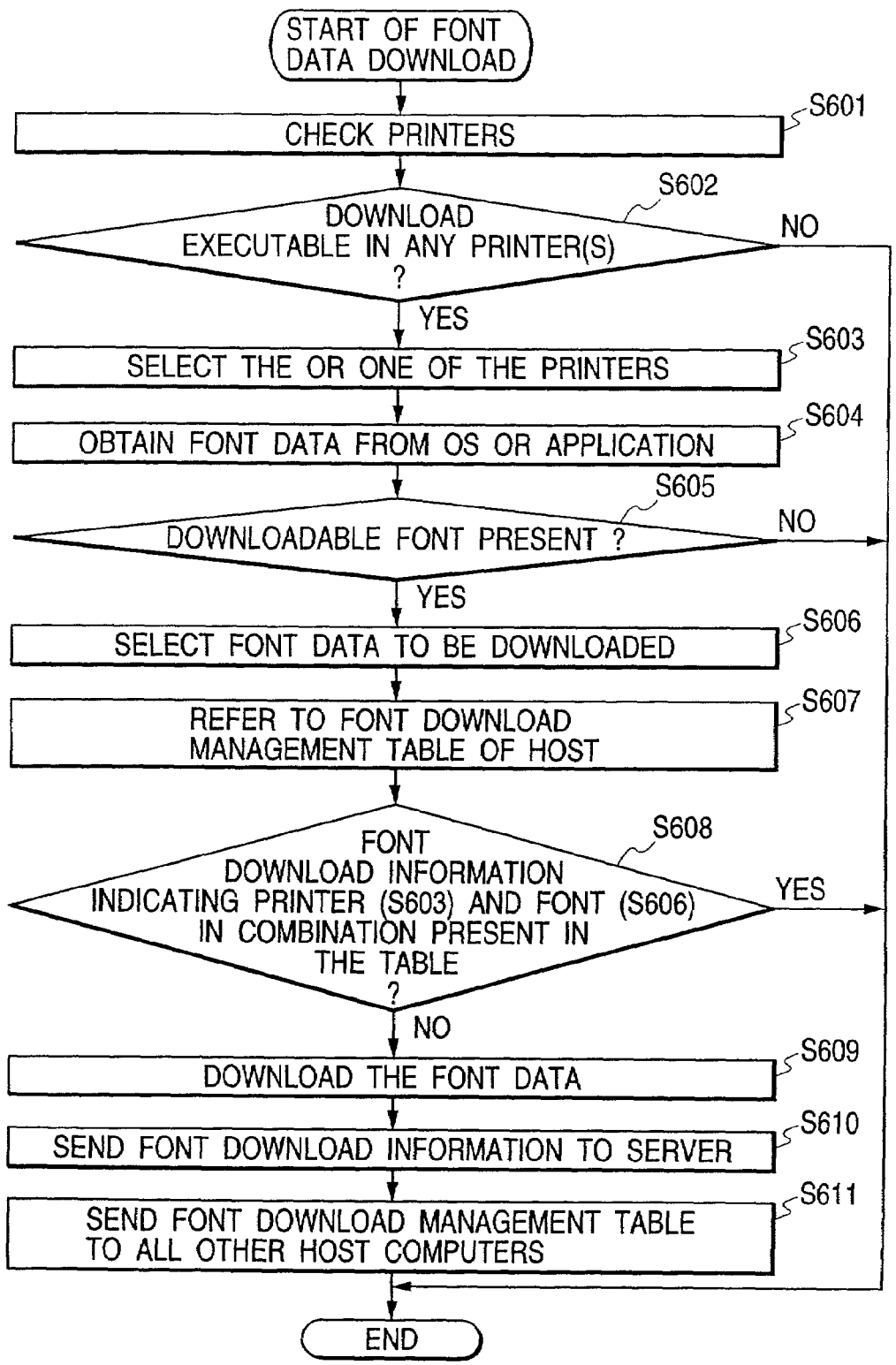
FIG. 7 is a flowchart showing a font download processing procedure in the second embodiment.

FIG. 7 is a flowchart showing a font data download processing procedure in the second embodiment. This processing program has been stored in the program ROM of the ROM 3. After this processing program was loaded into the RAM 2, it is executed by the CPU 1. First, information of a printing apparatus such as printer, image setter, or the like to be downloaded is obtained from the operating system (OS) or application on the host computer to control the downloading program (step S601).

On the basis of the information of the printer obtained in step S601, whether there is a printer in which the font data can be downloaded or not is discriminated (step S602). If the printer in which the font data can be downloaded does not exist, the processing routine is finished. If it exists, the printer 2000 to which the font data is downloaded is selected (step S603).

The information of the font data is obtained from the operating system (OS) or application on the host computer 1000 (step S604). On the basis of the information of the font data obtained in step S604, whether there is downloadable font data or not is discriminated (step S605).

If the downloadable font data does not exist, the processing routine is finished. If it exists, the font data to be downloaded is selected (step S606).

The font download management table in the host computer is referred to (step S607). A check is made to see if the font download information comprising a combination of two data of the "printer name" selected in step S603 and the "font information" selected in step S606 exists in the font download management table (step S608). If it already exists, the processing routine is finished. If it does not exist or if the font download management table itself does not exist, the font data is downloaded from the host computer 1000 to the external memory 14 such as an HD or the like in the printer 2000 (step S609).

Font download information is formed and sent to the server computer 3000 (step S610). After that, the font download management table is sent to all of the host computers connected to the server computer 3000 through the network such as LAN or the like or directly (step S611). The processing routine is finished.

Figure 8:
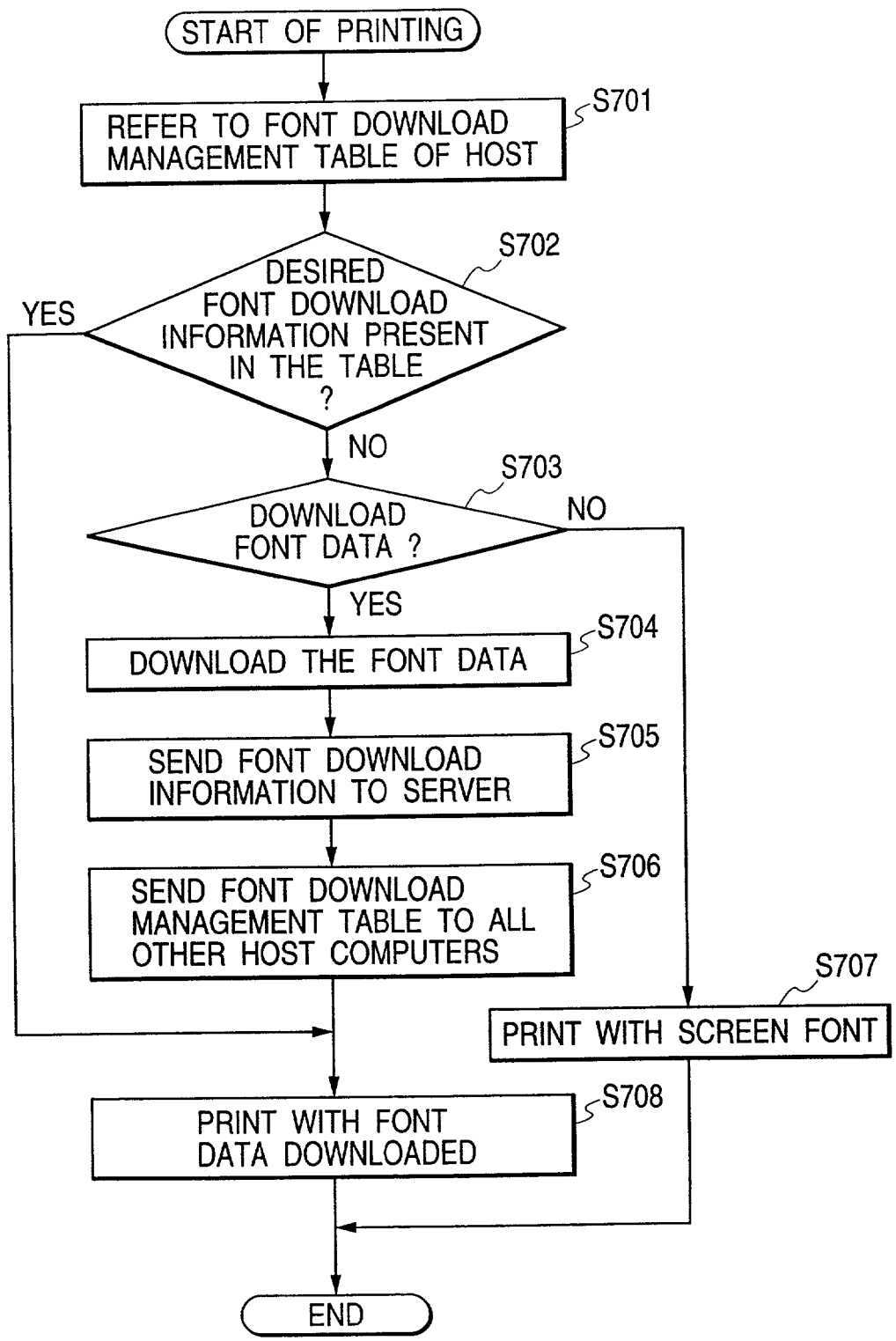
FIG. 8 is a flowchart showing a print processing procedure for actually downloading font data in the case where a print command is issued from a host computer to a printing apparatus which is connected through a network such as LAN or the like or directly.

FIG. 8 is a flowchart showing a print processing procedure for actually downloading the font data in the case where the print command is issued from the host computer to the printer connected through the network such as LAN or the like or directly. This processing program has been stored in the program ROM of the ROM 3. After this processing program was loaded into the RAM 2, it is executed by the CPU 1.

First, the font download management table in the host computer is referred to (step S701). A check is made to see if the font download information comprising a combination of two data of the "printer name" and the "font information" exists in this table (step S702). If the font download information already exists, the printing process is performed by using the downloaded font data (step S708).

If the font download information does not exist or if the font download management table itself does not exist, a check is made to see if the font data is downloaded from the host computer 1000 into the external memory 14 such as an HD or the like in the printer 2000 (step S703). If it is not downloaded, the printing process is performed by using the screen font existing in the host computer 1000 or by substituting another font data held in the printer 2000 for such a screen font and using such font data (step S707). The processing routine is finished.

In case of downloading it in step S703, the font data is downloaded from the host computer 1000 into the external memory 14 such as an HD of the printer 2000 (step S704). The font download information is sent to the server computer 3000 (step S705). After that, the font download management table is sent to all of the host computers connected to the server computer 3000 through the network such as LAN or the like or directly (step S706). The printing process is performed by using the downloaded font data (step S708). The processing routine is finished.

Figure 9:
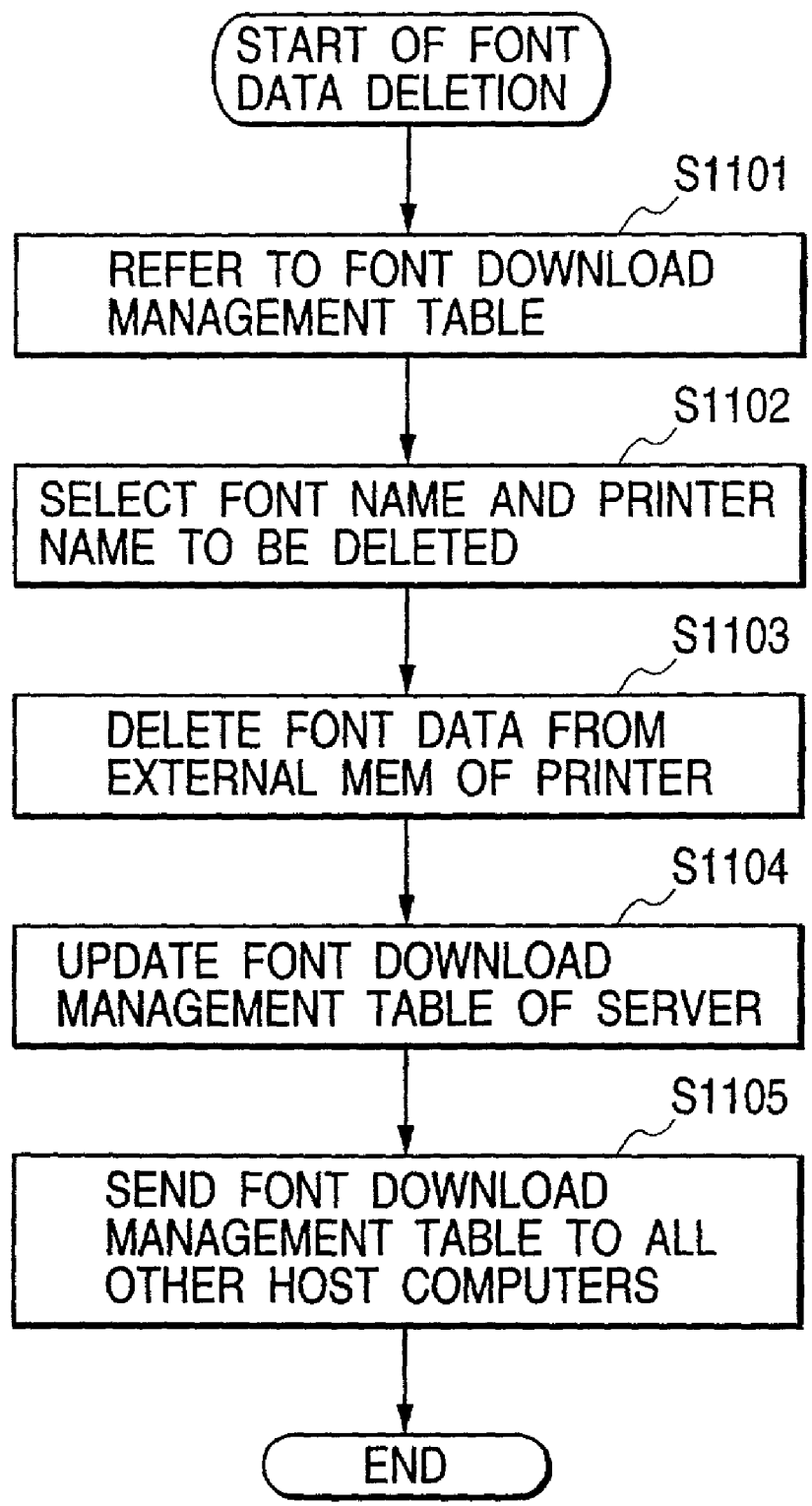
FIG. 9 is a flowchart showing a processing procedure for deleting downloaded font data.

FIG. 9 is a flowchart showing a processing procedure for deleting the downloaded font data. First, the font download management table is referred to (step S1101). The font name and printer name to be deleted are selected (step S1102). On the basis of the selected contents, the font data held in the external memory 14 of the printer 2000 is deleted (step S1103). An entry selected in step S1102 is deleted from the font download management table held in the server computer 3000 and is updated (step S1104). The font download management table updated in step S1104 is sent to the other host computer through the network such as LAN or the like (step S1105). The processing routine is finished.

As mentioned above, according to the second embodiment, each host computer 1000 connected to the network can manage the font download information and easily refer to it. The font download management tables in the server computer 3000 and in the host computer 1000 can be always updated to the latest tables and maintained.

[Third Embodiment]

In the third embodiment, since the system construction shown in FIG. 1 and the memory map shown in FIG. 2 are similar to those in the first embodiment, their description is omitted here.

In the third embodiment, the font download management table is held in the external memory such as an HD or the like annexed to the printer and updated each time the font data is downloaded from the host computer connected to the printer through the network such as LAN or the like or directly. There is shown a case of grasping a download situation by sending the font download management table to all of the host computers connected to the printer via the server computer just after the updating of the table.

Figure 10:
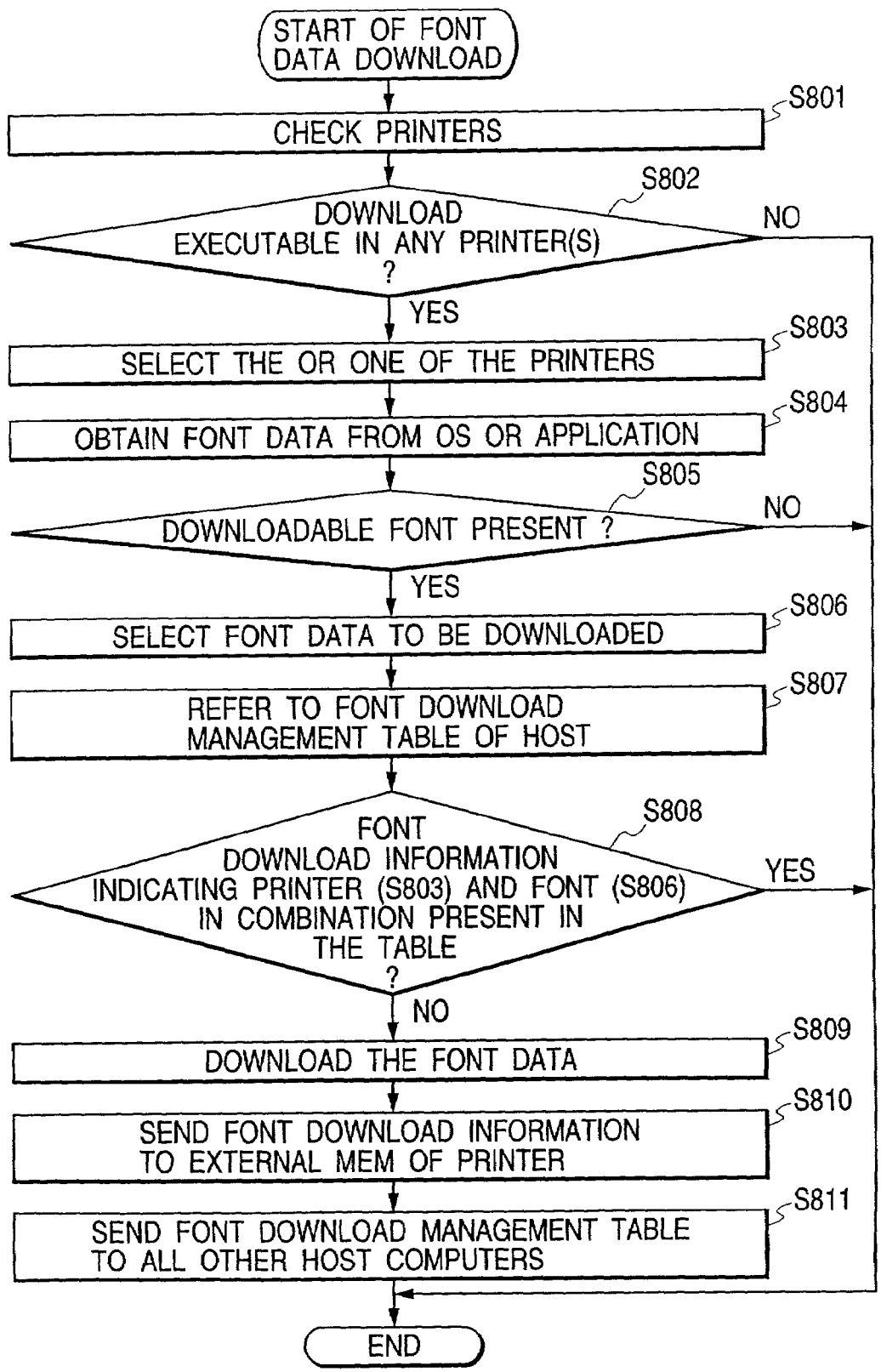
FIG. 10 is a flowchart showing a font download processing procedure in the third embodiment.

FIG. 10 is a flowchart showing a font data download processing procedure in the third embodiment. This processing program has been stored in the program ROM of the ROM 3. After this processing program was loaded into the RAM 2, it is executed by the CPU 1.

First, the information of the printing apparatus such as printer, image setter, or the like to be downloaded is obtained from the operating system (OS) or application on the host computer to control the downloading program (step S801).

On the basis of the information of the printer obtained in step S801, whether there is a printer in which the font data can be downloaded or not is discriminated (step S802). If the printer in which the font data can be downloaded does not exist, the processing routine is finished. If it exists, the printer 2000 to which the font data is downloaded is selected (step S803). The information of the font data is obtained from the operating system (OS) or application on the host computer 1000 (step S804).

On the basis of the information of the font data obtained in step S804, whether the downloadable font data exists or not is discriminated (step S805). If the downloadable font data does not exist, the processing routine is finished. If it exists, the font data to be downloaded is selected (step S806).

The font download management table in the host computer is referred to (step S807). A check is made to see if the font download information comprising a combination of two data of the "printer name" selected in step S803 and the "font information" selected in step S806 exists in the table (step S808). If such font download information already exists, the processing routine is finished. If it does not exist or if the font download management table itself does not exist, the font data is downloaded from the host computer 1000 into the external memory 14 such as an HD or the like of the printer 2000 (step S809).

The font download information is sent to the external memory 14 such as an HD or the like annexed to the printer 2000 (step S810). After that, the font download management table is sent to all of the host computers connected to the server computer 3000 through the network such as LAN or the like or directly (step S811). The processing routine is finished.

Figure 11:
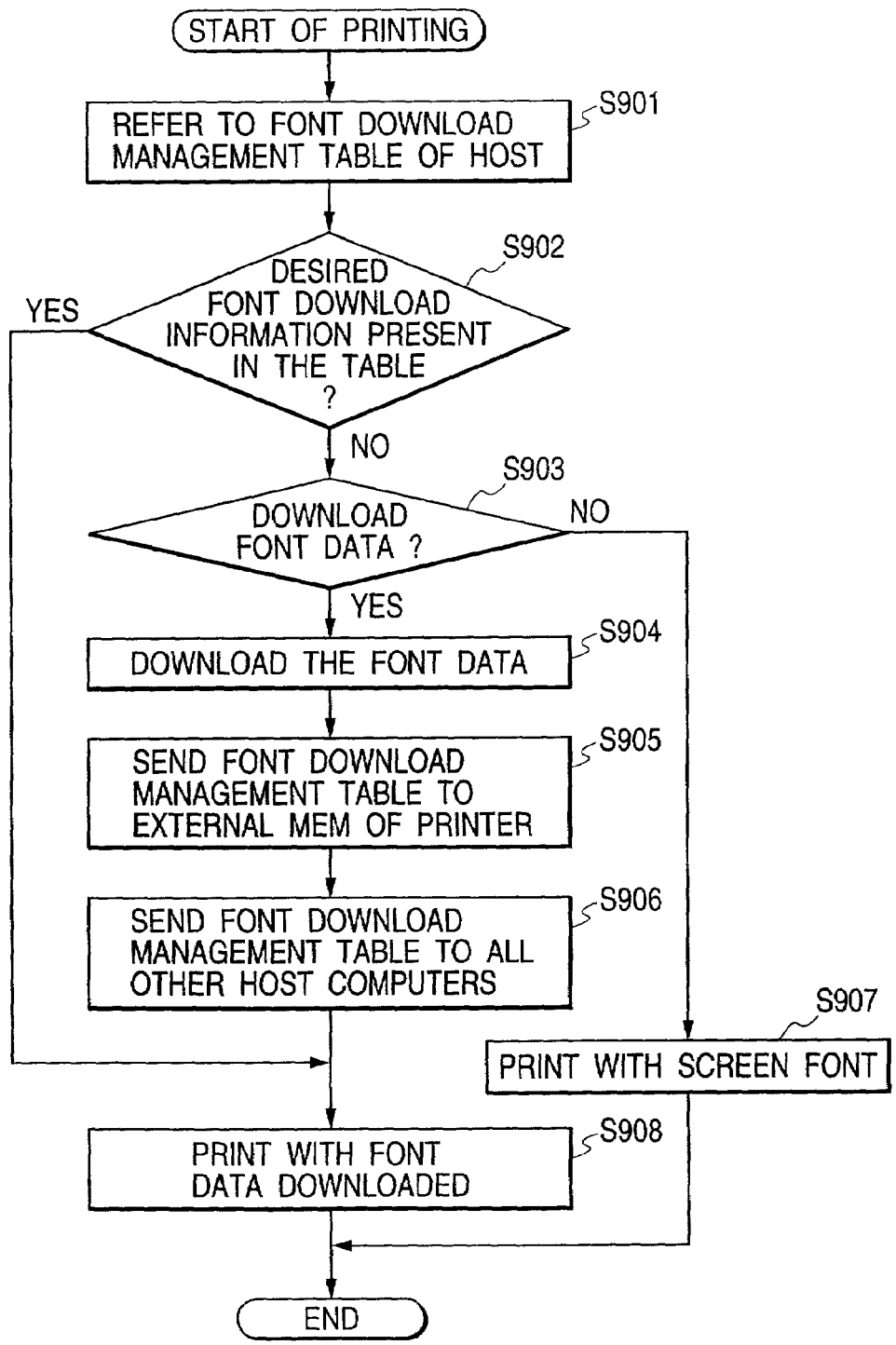
FIG. 11 is a flowchart showing a print processing procedure for actually downloading font data in the case where a print command is issued from a host computer to a printing apparatus which is connected through a network such as LAN or the like or directly.

FIG. 11 is a flowchart showing a print processing procedure for actually downloading the font data in the case where the print command is issued from the host computer to the printer connected through the network such as LAN or the like or directly. This processing program has been stored in the program ROM of the ROM 3. After this processing program was loaded into the RAM 2, it is executed by the CPU 1.

First, the font download management table in the host computer is referred to (step S901). A check is made to see if the font download information comprising a combination of two data of the "printer name" and the "font information" exists in this table (step S902). If it already exists, the printing process is performed by using the downloaded font data (step S908). The processing procedure is finished.

If it does not exist or if the font download management table itself does not exist, a check is made to see if the font data is downloaded from the host computer 1000 to the external memory 14 such as an HD or the like of the printer 2000 (step S903). If the font data is not downloaded, the printing process is performed (step S907) by using the screen font existing in the host computer 1000 or by substituting another font data held by the printer 2000 for such a screen font and using such font data. The processing routine is finished.

In case of downloading in step S903, the font data is downloaded from the host computer 1000 to the external memory 14 such as an HD or the like of the printer 2000 (step S904). The font download management table is sent to the external memory 14 such as an HD or the like annexed to the printer 2000 (step S905). After that, the font download management table is sent to all of the host computers connected to the printer 2000 through the network such as LAN or the like or directly (step S906). After that, the printing process is performed by using the downloaded font data in step S908. The processing routine is finished.

Figure 12:
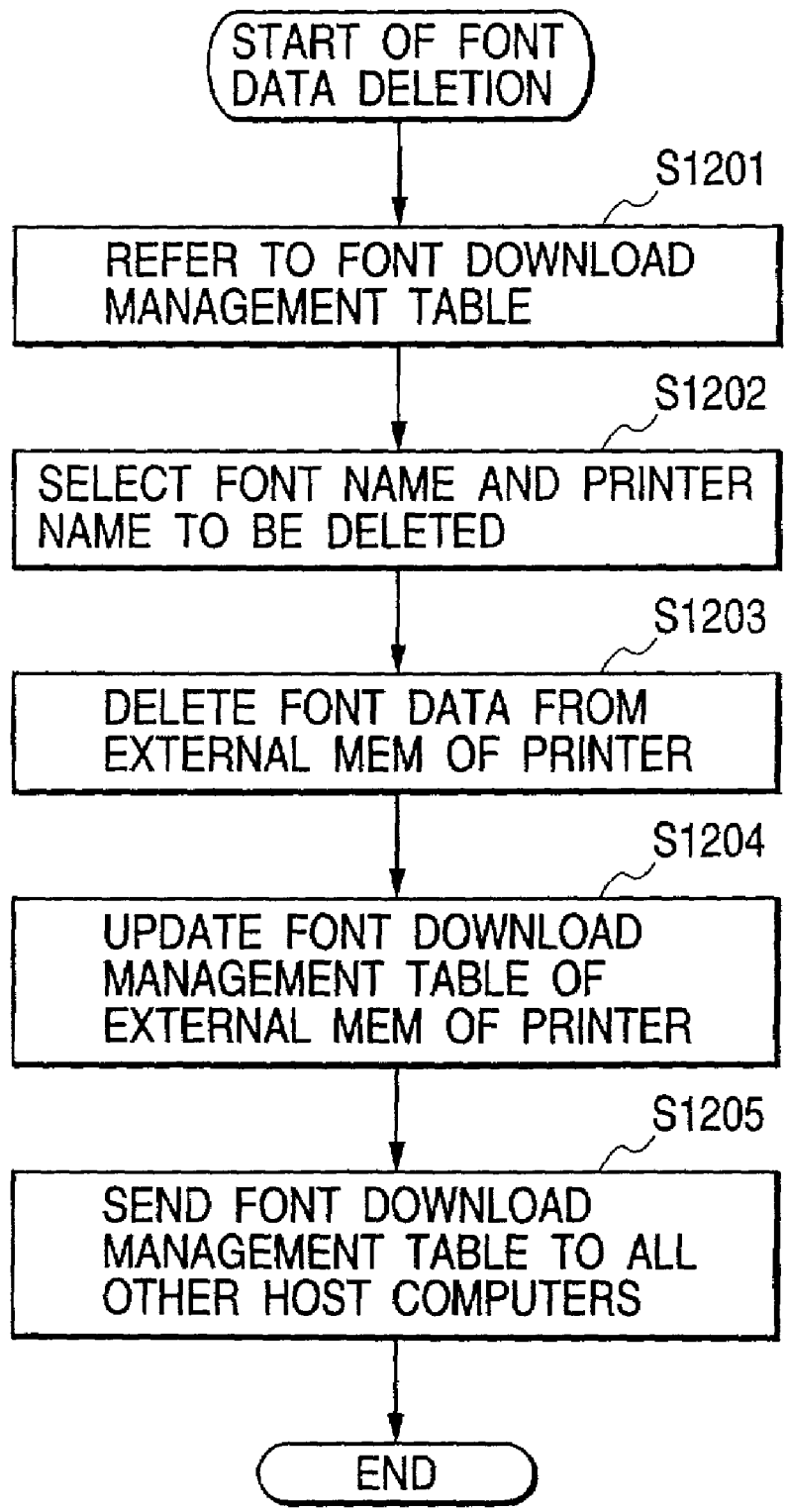
FIG. 12 is a flowchart showing a processing procedure for deleting downloaded font data.

FIG. 12 is a flowchart showing a processing procedure for deleting the downloaded font data. First, the font download management table is referred to (step S1201). The font name and printer name to be deleted are selected (step S1202). The font data held in the external memory 14 of the printer 2000 is deleted on the basis of the selected contents (step S1203). The entry selected in step S1202 is deleted from the font download management table held in the external memory 14 such as an HD annexed to the printer 2000 and is updated (step S1204). The font download management table updated in step S1204 is sent to the other host computer through the network such as LAN (step S1205). The processing routine is finished.

As mentioned above, in the third embodiment, the font download information can be managed without using the server computer 3000. The font download management tables in the external memory 14 of the printer 2000 and in the host computer 1000 can be always updated to the latest tables and maintained.

The invention shown in the first to third embodiments can be applied to a system constructed by a plurality of equipment or can be applied to an apparatus comprising one equipment. The invention can be applied to a case where it is accomplished by supplying a program to a system or apparatus. In this case, a program shown by software to accomplish the invention is stored into a storage medium and read out therefrom and installed into the system or apparatus, so that the system or apparatus can obtain the effects of the invention.

FIG. 13 is a diagram showing the memory map in the ROM 3 as a storage medium. A font data download processing module shown in FIGS. 3, 7, and 10, a print processing module shown in FIGS. 5, 8, and 11, and a font data deletion processing module shown in FIGS. 6, 9, and 12 have been stored in the ROM 3.

The storage medium is not limited to the ROM but it is possible to use any of, for example, a floppy disk, a hard disk, an optical disk, a magnetooptic disk, a CD-ROM, a CD-R, a DVD, a magnetic tape, a non-volatile memory card, and the like.

Further, the invention also incorporates a case where program codes read out from the storage medium are written into a memory equipped for a function expanding board inserted in a computer or a function expanding unit connected to the computer, and after that, a CPU or the like equipped for the function expanding board or function expanding unit executes a part or all of the actual processes on the basis of instructions of the program codes, and the functions of the foregoing embodiments are realized by those processes.

According to the print system of the invention, there is provided the print system in which at least one host computer and printer are connected, in the case where the font data is registered from the host computer into the memory of the printer and the printing process is performed by using the registered font data, when the font data is registered from the host computer into the memory of the printer, the font data and the font registration information regarding the printer are sent to at lest one of the other host computer and the memory of the printer by the transfer means, and in the case where the host computer prints by using the printer, the sent font registration information is referred to by the referring means, whether the printer name and font name which are required from the host computer to print by using the printer exist in the font registration information referred to or not is discriminated by the discriminating means, and when it is determined that they exist, the printing process is performed by the printing means by using the font data registered in the memory of the printer, so that in the case where the information regarding the printer and the font registration information such as information regarding the font data or the like are managed by at least one of the other host computer and the memory of the printer, and outputted from the host computer connected to the same network to the printer, the download information can be easily confirmed, and font data downloaded to the printers can be used in common, so that the printing efficiency can be remarkably improved.

According to the print system of the invention, the server computer to manage the network to which the host computers and printers are connected is included as another host computer, the transfer means sends the font registration information to the server computer, and the referring means refers to the font registration information sent to the server computer, so that the font data and the font registration information regarding the printer can be unitarily managed by the server computer.

According to the print system of the invention, in case of deleting the font data which has already been registered in the memory of the printer from the host computer, since the font registration information sent to the server computer is updated by the updating means, the font registration information unitarily managed by the server computer can be always updated to the latest information and maintained.

According to the print system of the invention, the server computer to manage the network to which the host computers and printers are connected is included as another host computer, the transfer means sends the font registration information to the other host computer including the server computer, and the referring means refers to the font registration information sent into the host computer to perform the printing process, so that each of the host computers connected to the network can manage the font registration information and easily refer to it.

According to the print system of the invention, in case of deleting the font data which has already been registered in the memory of the printer from the host computer, since the font registration information sent to the other host computer including the server computer is updated by the updating means, the font registration information in the server computer and the host computer can be always updated to the latest information and can be maintained.

According to the print system of the invention, the transfer means sends the font registration information to the memory of the printer and the other host computer and the referring means refers to the font registration information sent to the host computer to perform the printing process, so that the font registration information can be managed without using the server computer.

According to the print system of the invention, in case of deleting the font data which has already been registered in the memory of the printer from the host computer, since the font registration information sent to the memory of the printer and the other host computer is updated by the updating means, the font registration information in the memory of the printer and in the host computer can be always updated to the latest information and maintained.

According to the print system of the invention, since the memory of the printer is the external memory annexed to the printer, when an amount of font data increases, it is possible to easily cope with such a situation by expanding an external memory.

According to the print system of the invention, since the host computer and the printer are connected through the network, the print system comprising a plurality of host computers and printers can be easily constructed.

According to the invention, there is provided the storage medium which stores a program that is executed by a CPU in a print system in which at least one host computer and one printer are connected and is provided for registering the font data from the host computer into the memory of the printer and executing a printing process by using the registered font data, wherein the program comprises the steps of: when the font data is registered from the host computer into the memory of the printer, sending the font data and the font registration information regarding the printer to at least one of the other host computer and the memory of the printer; referring to the sent font registration information in the case where the host computer prints by using the printer; discriminating whether the printer name and font name which are required by the host computer to print by using the printer exist in the referred font registration information or not; and performing the printing process by using the font data registered in the memory of the printer when it is determined that they exist. Therefore, the storage medium having excellent expandability and generality of the print system can be provided.

According to the invention, the font registration information is sent to the memory of the printer and the other host computer, and in the referring step, the font registration information sent into the host computer to perform the printing process is referred to.

According to the invention, the program further comprises the step of, in case of deleting the font data which has already been registered in the memory of the printer from the host computer, updating the font registration information sent to the memory of the printer and the other host computer.

What is claimed is:

1. A host computer that communicates with a plurality of printing apparatuses via a network, said host computer comprising:
   a reference unit adapted to refer to font registration information that includes information specifying at least one font registered in each of the plurality of printing apparatuses;
   a font registration unit adapted to download font data by a font name unit to any one of the plurality of printing apparatuses for registration;
   a management unit adapted to retain the font registration information irrespective of a timing for executing a printing process, indicating the font name unit font data downloaded to each of the plurality of printing apparatuses by said font registration unit;
   a selection unit adapted to select a deletion combination of any one of the plurality of printing apparatuses and a font name, based on the font registration information referred to by said reference unit;
   an instruction unit adapted to issue a delete instruction to any one of the plurality of printing apparatuses to delete the font name unit font data; and
   a second selection unit adapted to select a download combination of any one of the plurality of printing apparatuses and a font name, based on the font registration information referred to by said reference unit, wherein said font registration unit issues a download instruction to any one of the plurality of printing apparatuses to download the font name unit font data in accordance with the selected download combination.

2. A host computer according to claim 1, wherein the font registration information includes information that indicates a printer name and a font name.

3. A host computer that communicates with a management apparatus, which manages fonts, and a plurality of printing apparatuses via a network, said host computer comprising:
   a reference unit adapted to refer to font registration information that includes information specifying at least one font registered in each of the plurality of printing apparatuses, wherein the font registration information is retained in the management apparatus;
   a font registration unit adapted to download font data by a font name unit to an, one of the plurality of printing apparatuses for registration;
   a transmission unit adapted to transmit registration information, indicating the font name unit font data downloaded to each of the plurality of printing apparatuses by said font registration unit, to the management apparatus so as to update the font registration information retained, irrespective of a timing for executing a printing process, in the management apparatus;
   a selection unit adapted to select a deletion combination of any one of the plurality of printing apparatuses and a font name, based on the font registration information referred to by said reference unit;

an instruction unit adapted to issue a delete instruction to any one of the plurality of printing apparatuses to delete the font name unit font data in accordance with the deletion combination selected by said selection unit; and a second selection unit adapted to select a download combination of any one of the plurality of printing apparatuses and a font name, based on the font registration information referred to by said reference unit, wherein said font registration unit issues a download instruction to any one of the plurality of printing apparatuses to download the font name unit font data in accordance with the selected download combination.

4. A print system comprising a plurality of printing apparatuses and a host computer that communicates via a network, in which system font data by a font name unit from said host computer is registered in said printing apparatuses, and said printing apparatuses perform a printing process using the registered font name unit font data, wherein said host computer comprises:

a reference unit adapted to refer to font registration information that includes information specifying at least one font registered in each of said plurality of printing apparatuses;

a font registration unit adapted to download the font name unit font data to any one of said plurality of printing apparatuses for registration;

a management unit adapted to retain the font registration information irrespective of a timing for executing the printing process, indicating the font name unit font data downloaded to each of the plurality of printing apparatuses by the font registration unit;

a selection unit adapted to select a deletion combination of any one of said plurality of printing apparatuses and a font name, based on the font registration information referred to by said reference unit;

an instruction unit adapted to issue a delete instruction to any one of said plurality of printing apparatuses to delete the font name unit font data in accordance with the deletion combination selected by said selection unit; and a second selection unit adapted to select a download combination of any one of the plurality of printing apparatuses and a font name, based on the font registration information referred to by said reference unit, wherein said font registration unit issues a download instruction to any one of the plurality of printing apparatuses to download the font name unit font data in accordance with the selected download combination.

5. A management method of a host computer that communicates with a plurality of printing apparatuses via a network, said method comprising:

a font registration step of downloading font data by a font name unit to any one of the plurality of printing apparatuses for registration;

a management step, performed by a management unit, of retaining the font registration information irrespective of a timing for executing a printing process, indicating the font name unit font data downloaded to each of the plurality of printing apparatuses in said font registration step;

a selection step of selecting a deletion combination of any one of the plurality of printing apparatuses and a font name, based on the font registration information referred to by in said reference step;

an instruction step of issuing a delete instruction to any one of the plurality of printing apparatuses to delete the font name unit font data in accordance with the deletion combination selected in said selection step; and a second selection step of selecting a download combination of any one of the plurality of printing apparatuses and a font name, based on the font registration information referred to in said reference step, wherein said font registration step issues a download instruction to any one of the plurality of printing apparatuses to download the font name unit font data in accordance with the selected download combination.

6. A method according to claim 5, wherein the font registration information includes information that indicates a printer name and a font name.

7. A management method of a host computer that communicates with a management apparatus, which manages fonts, and a plurality of printing apparatuses via a network, said method comprising:

a reference step of referring to font registration information that includes information specifying at least one font registered in each of the plurality of printing apparatuses, wherein the font registration information is retained in the management apparatus;

a font registration step of downloading font data by a font name unit to any one of the plurality of printing apparatuses for registration;

a transmission step of transmitting font registration information, indicating the font name unit font data downloaded to each of the plurality of printing apparatuses in said font registration step, to the management apparatus so as to update the font registration information retained, irrespective of a timing for executing a printing process, in the management apparatus;

a selection step of selecting a deletion combination of any one of said plurality of printing apparatuses and a font name, based on the font registration information retained in said transmission step;

an instruction step of issuing a delete instruction to any one of the plurality of printing apparatuses to delete the font name unit font data in accordance with the selected deletion combination selected in said selection step; and a second selection step of selecting a download combination of any one of the plurality of printing apparatuses and a font name, based on the font registration information referred to in said reference step, wherein said font registration step issues a download instruction to any one of the plurality of printing apparatuses to download the font name unit font data in accordance with the selected download combination.

8. A management method of a print system that includes a plurality of printing apparatuses and a host computer that communicates via a network, in which system font data by a font name unit from the host computer is registered in the printing apparatuses, and the printing apparatuses perform a printing process using the registered font name unit font data, said method comprising, at the host computer:

a reference step of referring to font registration information that includes information specifying at least one font registered in each of the plurality of printing apparatuses;

a font registration step of downloading the font name unit font data to the plurality of printing apparatuses for registration;

a management step of retaining the font registration information irrespective of a timing for executing the printing process, indicating the font name unit font data downloaded to each of the plurality of printing apparatuses in said font registration step;

a selection step of selecting a deletion combination of any one of said plurality of printing apparatuses and a font name, based on the font registration information referred to in said reference step;

an instruction step of issuing a delete instruction to any one of the plurality of printing apparatuses to delete the font name unit font data in accordance with the deletion combination selected in said selection step; and a second selection step of selecting a download combination of any one of the plurality of printing apparatuses and a font name, based on the font registration information referred to in said reference step, wherein said font registration step issues a download instruction to any one of the plurality of printing apparatuses to download the font name unit font data in accordance with the selected download combination.

9. A computer-executable program stored on a computer-readable medium, the computer-executable program for implementing a management method of a host computer that communicates with a plurality of printing apparatuses via a network, said computer program comprising:

code for a reference step of referring to font registration information that includes information specifying at least one font registered in each of the plurality of printing apparatuses;

code for a font registration step of downloading font data by a font name unit to the plurality of printing apparatuses for registration;

code for a management step, performed by a management unit, of retaining the font registration information and manage registration information irrespective of a timing for executing a printing process, indicating the font name unit font data downloaded to each of the plurality of printing apparatuses by said code for a font registration step;

code for a selection step of selecting a deletion combination of any one of the plurality of printing apparatuses and a font name, based on the font registration information referred to in said reference step;

code for an instruction step of issuing a delete instruction to any one of the plurality of printing apparatuses to delete the font name unit font data in accordance with the deletion combination selected by said selection step; and code for a second selection step of selecting a download combination of any one of the plurality of printing apparatuses and a font name, based on the font registration information referred to in said reference step, wherein said font registration step issues a download instruction to any one of the plurality of printing apparatuses to download the font name unit font data in accordance with the selected download combination.

10. A computer program product according to claim 9, wherein said computer program further comprises code for a second selection step of selecting a download combination of any one of the plurality of printing apparatuses and a font name, based on the font registration information referred to in said reference step, wherein said font registration step issues a download instruction to any one of the plurality of printing apparatuses to download the font name unit font data in accordance with the selected download combination.

11. A computer program product according to claim 9, wherein the font registration information includes information that indicates a printer name and a font name.

12. A computer-executable program stored on a computer-readable medium, the computer-executable program for implementing a management method of a host computer that communicates with a management apparatus, which manages fonts, and a plurality of printing apparatuses via a network, said computer program comprising:

code for a reference step of referring to font registration information that includes information specifying at least one font registered in each of the plurality of printing apparatuses, wherein the font registration information is retained in the management apparatus;

code for a font registration step of downloading font data by a font name unit to any one of the plurality of printing apparatuses for registration;

code for a transmission step of transmitting registration information, indicating the font name unit font data downloaded to each of the plurality of printing apparatuses by said code for a font registration step, to the management apparatus so as to update the font registration information retained, irrespective of a timing for executing a printing process, in the management apparatus;

code for a selection step of selecting a deletion combination of any one of the plurality of printing apparatuses and a font name, based on the font registration information referred to by in said reference step;

code for an instruction step of issuing a delete instruction to any one of the plurality of printing apparatuses to delete the font name unit font data in accordance with the deletion combination selected in said selection step; and code for a second selection step of selecting a download combination of any one of the plurality of printing apparatuses and a font name, based on the font registration information referred to in said reference step, wherein said font registration step issues a download instruction to any one of the plurality of printing apparatuses to download the font name unit font data in accordance with the selected download combination.

13. A computer-executable program stored on a computer-readable medium, the computer-executable program for implementing a management method of a print system that includes a plurality of printing apparatuses and a host computer that communicates via a network, in which system font data by a font name unit from the host computer is registered in the printing apparatuses, and the printing apparatuses perform a printing process using the registered font name unit font data, said computer program comprising, at the host computer:

code for a reference step of referring to font registration information that includes information specifying at least one font registered in each of the plurality of printing apparatuses;

code for a font registration step of downloading the font name unit font data to the plurality of printing apparatuses for registration;

code for a management step of retaining the font registration information irrespective of a timing for execution of the printing process, indicating the font name unit font data downloaded to each of the plurality of printing apparatuses by said code for a font registration step;

code for a selection step of selecting a deletion combination of any one of said plurality of printing apparatuses and a font name, based on the font registration information referred to in said reference step;

code for an instruction step of issuing a delete instruction to any one of the plurality of printing apparatuses to delete the font name unit font data in accordance with the deletion combination selected in said selection step; and code for a second selection step of selecting a download combination of any one of the plurality of printing apparatuses and a font name, based on the font registration information referred to in said reference step, wherein said font registration step issues a download instruction to any one of the plurality of printing apparatuses to download the font name unit font data in accordance with the selected download combination.

* * * * *

UNITED STATES PATENT AND TRADEMARK OFFICE
CERTIFICATE OF CORRECTION

| | | |
|---|---|---|
| PATENT NO. | : 7,155,476 B2 | |
| APPLICATION NO. | : 09/426878 | |
| DATED | : December 26, 2006 | |
| INVENTOR(S) | : Jun Horiyama | |

It is certified that error appears in the above-identified patent and that said Letters Patent is hereby corrected as shown below:

On the Title Page,
Item (*) Notice:
Insert the following: -- This patent issued on a continued prosecution application filed under 37 CFR 1.53(d), and is subject to the twenty year patent term provisions of 35 U.S.C. 154(a)(2). --; and
Item (54) Title, "PRINT SYSTEM, PRINTING METHOD, AND STORAGE MEDIUM" should read -- METHOD AND APPARATUS FOR COMMUNICATING FONT REGISTRATION INFORMATION --.

COLUMN 1:
Title, "PRINT SYSTEM, PRINTING METHOD, AND STORAGE MEDIUM" should read -- METHOD AND APPARATUS FOR COMMUNICATING FONT REGISTRATION INFORMATION --.

COLUMN 8:
Line 48, "downlodable" should read -- downloadable --.

COLUMN 10:
Line 33, "lest" should read -- least --.

COLUMN 12:
Line 55, "an, one" should read -- any one --.

COLUMN 13:
Line 52, "comprising:" should read -- comprising: ¶ a reference step of referring to font registration information that includes information specifying at least one font registered in each of the plurality of printing apparatuses; --; and
Line 65, "by in" should read -- in --.

UNITED STATES PATENT AND TRADEMARK OFFICE
CERTIFICATE OF CORRECTION

PATENT NO. : 7,155,476 B2
APPLICATION NO. : 09/426878
DATED : December 26, 2006
INVENTOR(S) : Jun Horiyama It is certified that error appears in the above-identified patent and that said Letters Patent is hereby corrected as shown below:

COLUMN 15:
Lines 55-64, Claim 10 should be deleted.

Signed and Sealed this

Twenty-third Day of October, 2007

JON W. DUDAS
*Director of the United States Patent and Trademark Office*